INVENTORS
Karl Butter
Kuno Knauer

United States Patent Office 3,738,916
Patented June 12, 1973

3,738,916
PROCESS FOR THE PRODUCTION OF REGENERATIVELY COOLED ROCKET COMBUSTION CHAMBERS AND THRUST NOZZLE ASSEMBLIES
Karl Butter, Munich, and Kuno Knauer, Moosach, Germany, assignors to Messerschmitt-Bolkow-Blohm, GmbH, Munich, Germany
Filed Mar. 12, 1971, Ser. No. 123,535
Claims priority, application Germany, Mar. 28, 1970, P 20 15 024.7
Int. Cl. C23b 7/00, 7/02; B65h 8/00
U.S. Cl. 204—9           9 Claims

ABSTRACT OF THE DISCLOSURE

A process for the production of rocket combustion chambers and thrust nozzle assemblies having lengthwise cooling channels. The process consists of the following steps:
(1) Cutting the negative form of the cooling channels into the surface of a suitable core;
(2) Galvanically depositing a first layer on the core surface to provide the inner wall of the rocket combustion chamber and thrust nozzle assembly said inner wall also defining said cooling channels;
(3) Filling the cooling channels externally with an electrically conductive fill material; and
(4) Galvanically depositing a second layer on said first layer and the fill material to provide a smooth external wall for the rocket combustion chamber and thrust nozzle assemblies.

---

Figure 1:
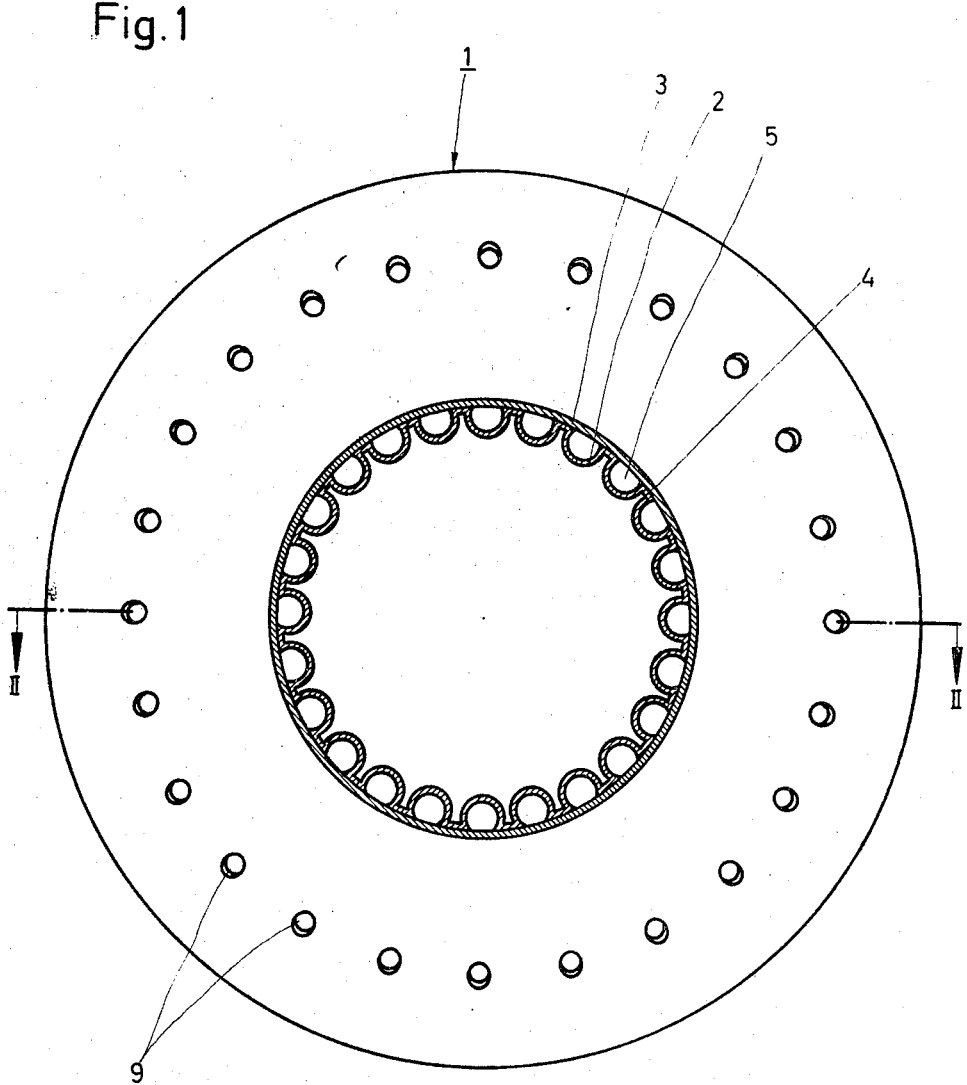

The invention refers to a process for the production of combustion chambers and/or booster jets with lengthwise cooling channels by a galvano-plastic method, utilizing a reuseable galvanic core and partitioned if desired, with an outer contour that corresponds to the inner contour of the intended rocket combustion chamber and thrust nozzle assembly. The galvanic base or core will be removed after the completion of the manufacturing of the rocket combustion chamber and thrust nozzle assembly according to the method of the invention. "Galvanize" and derivative forms thereof as used herein is intended to mean electroform and electrodeposit.

In a presently known process of the above-mentioned type (see German Pat. No. 611,501 and "Liquid Rockets and Propellants" published by L. E. Bollinger, vol. 2, beginning at page 563), at first an initially smooth galvanic layer is applied to a reuseable, cross-wise partitioned galvanic base having a smooth outer surface, said outer contour corresponding to the inner contour of the intended regeneratively cooled thrust nozzle. On top of this galvanic layer which is simultaneously the inner surface of the thrust nozzle, a layer of meltable fill material is then applied which however, is electrically nonconducting.

Next, grooves are cut out of the above-mentioned layer of electrically nonconducting fill material corresponding to the lengthwise direction of the base, to form the sidewalls of the intended cooling channels. For geometric and cooling thermo-technological reasons, such cooling channels have to have varying cross-sections over their entire length, or at least over a large portion thereof. As is well known, very expensive cutting machines and a great amount of time are required for the manufacturing of these grooves.

Following this very complicated manufacturing stage, the sidewalls of the cooling channels are made by filling the above-mentioned grooves by a galvano-plastic method. Then the radially outward surfaces of the electrically nonconducting fill material which remains between the sidewalls are covered with a layer of electrically conducting material. These layers frequently are badly damaged during the mechanical or chemical activation of the radially outward bridge surfaces of the sidewalls, which activation precedes the galvano-plastic mounting of exterior wall of the thrust nozzle. This results in damaged or weak places in the outer wall of the thrust nozzle.

An additional disadvantage is, that the galvano-plastic outer wall of the thrust nozzle has in a circumferential direction, greatly differing wall thicknesses which in each case will require considerable corrective cutting work. The cause of these variations in thickness can be traced to the frequently very considerable variability in the electrical conductivity of the metallic sidewalls of the cooling channels on the one hand, and in the electrically conducting material suitable for the coating layers between the previously mentioned sidewalls on the other hand, which after the completion of the thrust nozzle outer wall will have to be melted out along with the electrically non-conducting fill material from within the cooling channels, the walls of which are formed by the thrust nozzle outer walls, the thrust nozzle inner walls, and the side border walls. Because of the last-mentioned procedure, the complicated cutting of grooves for the side walls of the cooling channels out of the layer of electrically nonconducting fill material has to be done separately for each individually produced thrust nozzle model, which as in previously mentioned reasons will result in excessively high manufacturing costs.

The purpose of this invention is to develop a process of the above-mentioned type which, however, can be executed by much simpler means than with the known method, and which makes possible the less expensive production of regeneratively cooled rocket combustion chambers and thrust nozzle assemblies of great mechanical stability. By the following manufacturing procedure, this function is achieved according to the invention:

(a) Cutting of negative forms of the cooling channels into the surface of the galvanic core, for example, with the aid of a copying, cutting machine.

(b) Preparation of an inner wall of the rocket combustion chamber and thrust nozzle assembly having the cooling channels by application of a primary galvanic layer on top of the core surface which is provided with the negative forms of the cooling channels.

(c) Leveling in said cooling channels in the first galvanic layer by filling them with a fill material having good electrical conductivity, such as Wood's Metal, conductive wax, or material of similar nature, and (d) Completion of a smooth outer wall for the rocket combustion chamber and thrust nozzle assembly which covers the leveled in cooling channels of the inner wall of the rocket combustion chamber and thrust nozzle assembly, by external application of a second galvanic layer onto the first layer which latter forms the inner wall of the rocket combustion chamber and thrust nozzle assembly after an activation of the same.

The process according to the invention, contrary to the known manufacturing process of this type, requires comparatively little time, equipment, or machine effort, and hence allows for a time saving and inexpensive series production of regeneratively cooled, durable rocket combustion chambers and thrust nozzle assemblies with cooling channels of varying diameter; even when the greatest precision is required and, to save weight, for the smallest wall thickness. These advantages are based on the following considerations.

For one thing, because of the cutting of the negative forms of the cooling channels in the reuseable galvanic core, preferably done in a continuous cutting process, there is no need for time consuming cutting out of grooves for the sidewalls of the cooling channels into fill material which can subsequently be melted out, as is necessary with the hereto conventional method in the production of each individual booster jet. Further, it is unnecessary to cover the radially outlying surfaces of the cooling channel fillings with electrically conducting material, which subsequently can also be melted out, because such a substance, with good electrically conducting quality, is already used in the leveling in process of the cooling channels in the inner wall of the rocket combustion chamber and thrust nozzle assembly. Because the cooling channel fillings are of good electrically conducting characteristics throughout, and not only along their radially outerlying surfaces which, as previously mentioned, would rarely withstand the activation of the radially outlying bridge surfaces of the inner walls of the rocket combustion chamber and thrust nozzle assembly without any damage, even the outer walls which are applied subsequent to this activation, in the production of combusution chambers according to the invention, are always of perfect quality and substance. With rocket combustion chambers and thrust nozzle assemblies built according to the hereto conventional method, this is frequently not the case. The mechanical corrective cutting work which up to now was always required to improve the quality of the outer walls of the rocket combustion chambers and thrust nozzle assembly is now also rendered unnecessary, or at least its need is considerably reduced, because the materials used for filling in the cooling channels are with respect to their electrical conductivity, superior to those suitable for the coating process in the conventional method, and therefore guarantee uniformly thick, or at least more uniformly thick, outer walls.

Lastly, the procedure according to the invention allows for a very close spacing of cooling channels in the circumferential direction of the rocket combustion chambers and thrust nozzle assembly which for cooling thermal radiation reasons is very desirable. Up to now, such a close arrangement of cooling channels was not possible, because the resulting, very narrow bridge surfaces of the sidewalls of the successive cooling channels were inadequate to form a mechanically solid, galvanic binding between inner and outer walls of a combustion chamber and/or booster jet. The process of the present invention guarantees a sufficiently solid connection between the galvano-plastically produced inner walls of a rocket combustion chamber and thrust nozzle assembly and in like manner produce satisfactory outer walls for the rocket combustion chamber and thrust nozzle assembly, even when the negative forms of the cooling channels are at their sides separated only by very thin core bridges. This can be explained that in such a case during the application of the inner wall of the rocket combustion chamber and thrust nozzle assembly on to a galvanic core, prepared according to the invention, higher electrical densities develop at the core parts remaining between the negative forms of the cooling channels, due to the so called tip effect at the radially outlying surfaces of the core bridges, which cause a thicker depositing of material at these critical bridge surfaces of the galvanic core, and thereby produce sufficiently large connection surfaces in the inner wall of the rocket combustion chamber and thrust nozzle assembly.

In a further development of the invention, after the completion of the outer wall of the rocket combustion chamber and thrust nozzle assembly, but prior to the removal of the galvanic core, and the melting of the fill material out of the cooling channels, the usual intake and output collection chambers associated therewith are also produced by a galvano-plastic method, that is, by using forms of meltable material. The fact that this manufacturing stage is completed while the galvanic core is still in position considerably simplifies the production.

This also applies to an additional feature of the invention, when at a point of partial galvanic covering, it is possible to accomplish the intended attaching of any desired intake and output connection pipes to the outer wall of the combustion chamber, or alternatively to the intake and output collection chambers which are also produced by a galvano-plastic method. By this method the galvanic connection stability between the outer and the inner wall of the rocket combustion chamber and thrust nozzle assembly is in no way affected, while with the conventional method of welding or soldering these connection pipes, there may occur a considerable undesireable reduction in durability due to the resulting temperatures.

In a rocket combustion chamber and thrust nozzle assembly models built according to the method of the invention, the cooling channels which extend lengthwise inside the inner wall are closed at either end. To compensate for this, input and output openings are provided in the covering outer wall of the rocket combustion chamber and thrust nozzle assembly, in order to connect these cooling channels with the input and output collection chambers are respectively with the input and output connection pipes. These openings allow for an optimum connection between the actual body of the rocket combustion chamber and thrust nozzle assembly, and the appropriate input and output element by a galvano-plastic method.

In nozzle assemblies with a relatively high expansion factor, particularly nozzles used in a rear vacuum, according to an additional feature of the invention, the cooling channels in the divergent nozzle part which are preferably closed off at either end, are caused to branch out fan-like towards the rear end of the nozzle assembly, beginning at a point of selected diameter. Thus, the wall spaces between the cooling channels which are not affected by the cooling media are prevented from becoming too large with increasing diameter, which is of great disadvantage for best cooling.

Further details of the invention can be seen in the schematically represented illustrations of the working model, described in the following:

There is shown in—

Figure 2:
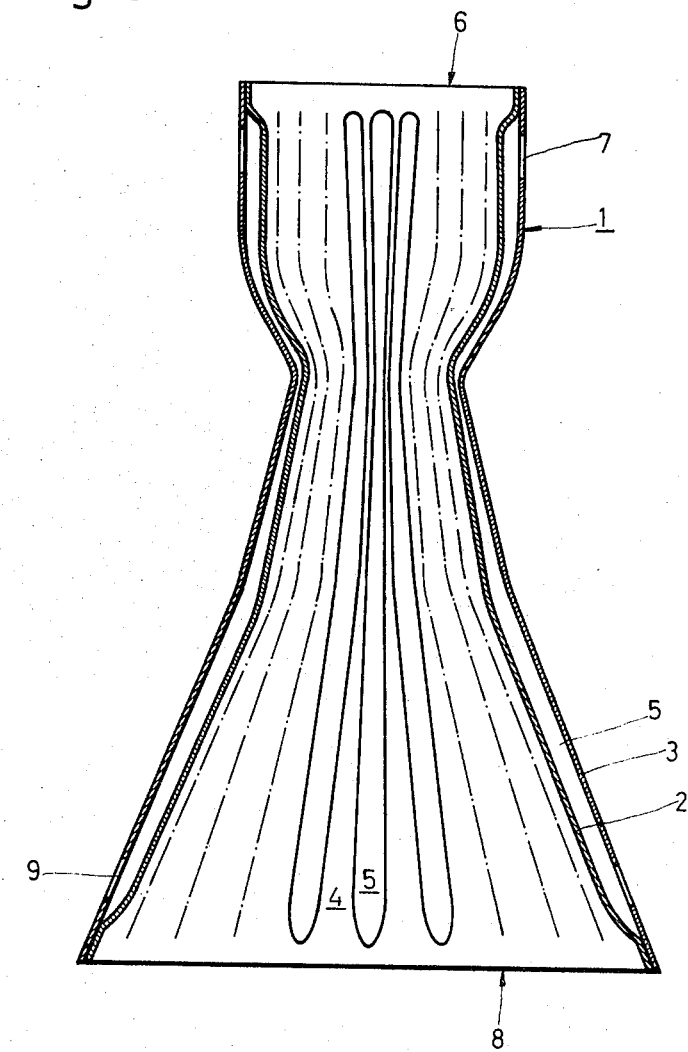

FIG. 1: a cross-section of a preferable working model of a rocket combustion chamber and thrust nozzle assembly, manufactured according to the invention and FIG. 2: in reduced scale, a lengthwise section of the model of the rocket combustion chamber and thrust nozzle assembly according to FIG. 1, along the section lines II—II of FIG. 1.

The rocket combustion chamber and thrust nozzle assembly 1, illustrated in FIGS. 1 and 2 in simplified fashion, and manufactured according to the method of the invention, is made for example of nickel and consists of a first galvanic layer 2 which forms the inner wall, and of second galvanic layer which forms the outer wall 3. The first galvanic layer is composed of alternately successive wall bridges 4 together with cooling channels 5 which extend radially inwardly from said wall bridges 4. These cooling channels are positioned lengthwise along the inside of the rocket combustion chamber and thrust nozzle assembly 1 and are closed at their respective ends. The second galvanic layer 3 which forms the exterior wall of the rocket combustion chamber and thrust nozzle assembly 1, and which is in the vicinity of the wall bridges 4 metallically connected with the galvanic layer 2, the interior wall of the rocket combustion chamber and thrust nozzle assembly 1 has at the forward end 6 of the combustion chamber the outlet openings 7 and at the rearward end of the booster jet 8 the intake openings 9 for the cooling medium. These openings 7, 9 form a connection between the intake and output collection chambers—not shown for reasons of clarity, and as previously mentioned, also produced by galvano-plastic method—and respectively between the intake and output pipe connections and the cooling channels 5.

The embodiments of the invention in which an exclusive property or privilege is claimed are defined as follows:

1. A process for the manufacturing of rocket combustion chambers and thrust nozzle assemblies, the steps comprising:
    electroforming a first layer on a core having a plurality of longitudinally extending and alternating ribs and grooves thereon to obtain an electroformed layer having a substantially uniform thickness and having longitudinally extending alternating ribs and recesses on an inner surface, said ribs filling said grooves on said core and said recesses being defined by the electroformed layer over said ribs on said core, the outer surface of said first layer having longitudinally extending alternating ribs and recesses, said recesses on said outer surface being formed by the electroformed layer in said grooves in said core and said ribs on said outer surface being formed by the electroformed layer on said ribs of said core;
    filling said recesses on said outer surface of said first layer with an electrically conductive filler material; and
    electroforming a second layer of substantially uniform thickness on said outer surface of said first layer and said filler material, said second layer being bonded to said first layer.

2. The process according to claim 1, wherein said bonding of said second layer to said first layer is caused to occur at said ribs on said outer surface of said first layer.

3. The process according to claim 2, wherein said filler material comprises a meltable material; and
    including the additional step after said electroforming of said second layer of melting said filler material to create longitudinally extending passageways in said combustion chambers and thrust nozzle assemblies.

4. The process according to claim 1, wherein said filler material completely fills said recesses on said outer surface of said first layer.

5. The process according to claim 1, wherein said step of electroforming said second layer defines a smooth outer surface on said second layer.

6. The process according to claim 1, wherein said core is reuseable.

7. The process according to claim 6, including the step of activating said first layer prior to said electroforming of said second layer.

8. The process according to claim 6, wherein said intake and output chambers are formed after said electroforming of said second layer but prior to the removal of said core.

9. The process according to claim 6, including the step of electroforming intake and output collection chambers about forms of meltable material while said core remains internally of said first layer.

References Cited

UNITED STATES PATENTS

| | | | |
|---|---|---|---|
| 3,208,132 | 9/1965 | Escher | 60—267 |
| 3,595,025 | 7/1971 | Stockel | 204—9 |
| 3,424,657 | 1/1969 | Fialkoff | 204—9 |
| 1,646,602 | 10/1927 | Smith | 204—9 |
| 3,267,664 | 4/1966 | Jones et al. | 60—267 |
| 3,516,254 | 6/1970 | Hammond | 60—267 |
| 3,022,230 | 2/1962 | Fialkoff | 204—9 |

OTHER REFERENCES

Safranek, "Don't Overlook Electroforming," Product Engineering, p. 609, June 5, 1961 (1961, McGraw-Hall, New York, N.Y.).

Fialkoff et al.: "Fabrication, Structural and Heat Transfer Constructions of Electroformed Rocket Nozzles," Progress in Astronautics & Rocketry, vol. 2, 1960, Academic Press, pp. 562–587.

AL L. SMITH, Primary Examiner

W. OLSEN, Assistant Examiner

U.S. Cl. X.R.
60—267; 204—16